(12) United States Patent
Sundberg et al.

(10) Patent No.: US 9,399,478 B2
(45) Date of Patent: Jul. 26, 2016

(54) STROLLER

(71) Applicant: Dorel Juvenile Group, Inc., Foxboro (JP)

(72) Inventors: Brian C Sundberg, Chester, NH (US);
Kurt Nygren, Harvard, MA (US);
Walter S Bezaniuk, Berkley, MA (US);
Joseph D Langley, Foxboro, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/628,822

(22) Filed: Feb. 23, 2015

(65) Prior Publication Data

US 2015/0307120 A1     Oct. 29, 2015

Related U.S. Application Data

(60) Provisional application No. 61/971,278, filed on Mar. 27, 2014.

(51) Int. Cl.
*B62B 7/06* (2006.01)
*B62B 9/20* (2006.01)

(52) U.S. Cl.
CPC .. *B62B 7/062* (2013.01); *B62B 9/20* (2013.01)

(58) Field of Classification Search
CPC .............. B62B 7/06–7/066; B62B 7/08–7/086
See application file for complete search history.

(56) References Cited

U.S. PATENT DOCUMENTS

| | | | |
|---|---|---|---|
| 4,216,974 A * | 8/1980 | Kassai | B62B 7/062 280/42 |
| 4,765,645 A | 8/1988 | Shamie | |
| 5,460,399 A | 10/1995 | Baechler et al. | |
| 5,599,033 A | 2/1997 | Kolbus et al. | |
| 6,428,034 B1 | 8/2002 | Bost | |
| 6,682,090 B2 | 1/2004 | Chen | |
| 6,976,697 B2 | 12/2005 | Britton et al. | |
| 7,168,728 B2 | 1/2007 | Suga et al. | |
| 7,229,091 B2 | 6/2007 | Lan | |
| 7,341,265 B1 | 3/2008 | Liu | |
| 7,434,827 B2 | 10/2008 | Yeh et al. | |
| 7,770,911 B2 | 8/2010 | Dotsey et al. | |
| 8,205,907 B2 | 6/2012 | Chicca | |
| 8,894,090 B1 * | 11/2014 | Chen | 280/647 |
| 2005/0127640 A1 | 6/2005 | Worth et al. | |
| 2012/0025491 A1 | 2/2012 | Li | |
| 2013/0113189 A1 | 5/2013 | Doucette et al. | |
| 2013/0140797 A1 | 6/2013 | Fritz et al. | |

FOREIGN PATENT DOCUMENTS

EP     1323614 A1   7/2003
KR  20-0196566 Y1   9/2000

OTHER PUBLICATIONS

PCT International Search Report and Written Opinion mailed Sep. 1, 2015 and issued in connection with PCT/US2015/010977.

* cited by examiner

*Primary Examiner* — Jeffrey J Restifo
*Assistant Examiner* — Erez Gurari
(74) *Attorney, Agent, or Firm* — Barnes & Thornburg LLP

(57) ABSTRACT

A compact collapsible stroller includes a mobile base provided with front and rear wheels. A push handle is coupled to the mobile base.

13 Claims, 2 Drawing Sheets

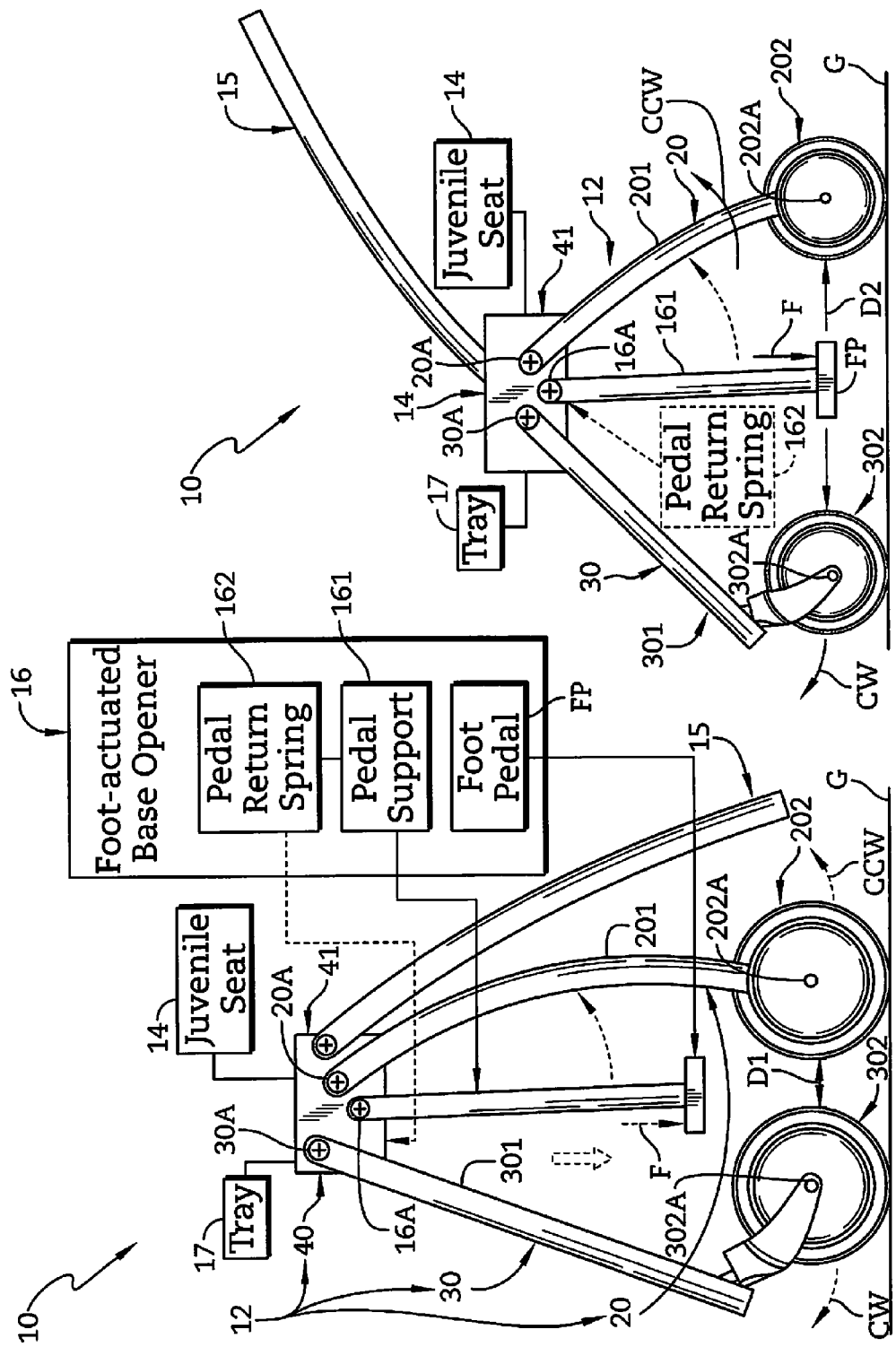

STROLLER

PRIORITY CLAIM

This application claims priority under 35 U.S.C. §119(e) to U.S. Provisional Application Ser. No. 61/971,278, filed Mar. 27, 2014, which is expressly incorporated by reference herein.

BACKGROUND

The present disclosure relates to collapsible strollers for juveniles, and particularly to strollers including a frame assembly, a seat, and several wheels. More particularly, the present disclosure relates to a collapsible and expandable frame assembly for a juvenile stroller.

SUMMARY

A compact collapsible stroller in accordance with the present disclosure includes a mobile base provided with front and rear wheels. A push handle is coupled to the mobile base in illustrative embodiments.

In illustrative embodiments, the mobile base is foldable at the option of a caregiver using a foot-actuated base opener during controlled collapse of the collapsible stroller. The mobile base includes a rolling rear-leg unit and a rolling front-leg unit that can be moved away from a folded position that is located alongside the rolling rear-leg unit and associated with a collapsed storage mode of the stroller to an unfolded position that is associated with an expanded use mode of the stroller when the mobile base is unfolded so that a child can be seated on a juvenile seat coupled to the mobile base. In some illustrative embodiments, the rear-leg and front-leg units pivot about separate pivot axes during folding and unfolding of the mobile base.

In illustrative embodiments, the stroller includes a foot-actuated base opener associated with the rolling front-leg and rear-leg units of the mobile base. A caregiver operates the foot-actuated base opener to change the stroller from a collapsed storage mode to an expanded use mode by stepping on a foot pedal included in the foot-actuated base opener and moving the foot pedal toward the ground underlying the mobile base. This downward movement of the foot pedal causes the rolling front-leg unit to move away from the folded position located alongside the rolling rear-leg unit to the unfolded position associated with the expanded use mode of the stroller.

In illustrative embodiments, the mobile base further includes a leg spreader interposed between upper portions of the rolling front-leg and rear-leg units. In such embodiments, the rolling front-leg unit is pivotably coupled to the leg spreader for pivotable movement about a front horizontal leg-pivot axis during folding and unfolding of the mobile base. The rolling rear-leg unit is pivotably coupled to the leg spreader for pivotable movement about a separate rear horizontal leg-pivot axis during folding and unfolding of the mobile base. The foot-actuated base opener is coupled to the leg spreader and formed to include a foot pedal that is pushed downwardly by the foot of a caregiver to move the leg spreader downwardly toward the ground to pivot the rolling front-leg unit in a clockwise direction about the front horizontal leg-pivot axis and to pivot the rolling rear-leg unit in a counterclockwise direction about the rear horizontal leg-pivot axis to unfold the mobile base to place the stroller in an expanded use mode.

A pedal-return spring is also included in illustrative embodiments of the foot-actuated base opener. A pedal-return spring is coupled to the leg spreader and to a pedal support included in the foot-actuated base opener and arranged to carry the foot pedal normally to urge the foot-actuated base opener to a ready-to-use retracted position alongside the rolling rear-leg unit. The pedal-return spring is configured normally to apply a torque to the pedal support to urge the pedal-support and the foot pedal to lie out of the way and alongside the rolling rear-leg unit. In such a ready-to-use retracted position, the foot pedal is nevertheless accessible and usable by a caregiver desiring to step on the foot pedal to unfold the mobile base to convert the stroller to the expanded use mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is an illustrative side elevation view of a collapsible stroller in accordance with the present disclosure showing that a mobile base in a folded position while the stroller is in a collapsed storage mode and showing that the mobile base includes a leg spreader, a rolling front-leg unit pivotably coupled to the leg spreader for pivotable movement about a front pivot axis, a rolling rear-leg unit pivotably coupled to the leg spreader for pivotable movement about a separate rear pivot axis, and a foot-actuated base opener including a pedal support pivotably coupled to the leg spreader for pivotable movement about a pivot axis, a foot pedal coupled to a lower portion of the pedal support, and a pedal-return spring coupled to the leg spreader and to the peddle support;

FIG. 2 is a view similar to FIG. 1 showing the mobile base in an unfolded position and the stroller in an expanded use mode after the foot-actuated base opener has been used by a caregiver to unfold the mobile base.

DETAILED DESCRIPTION

Figure 3:
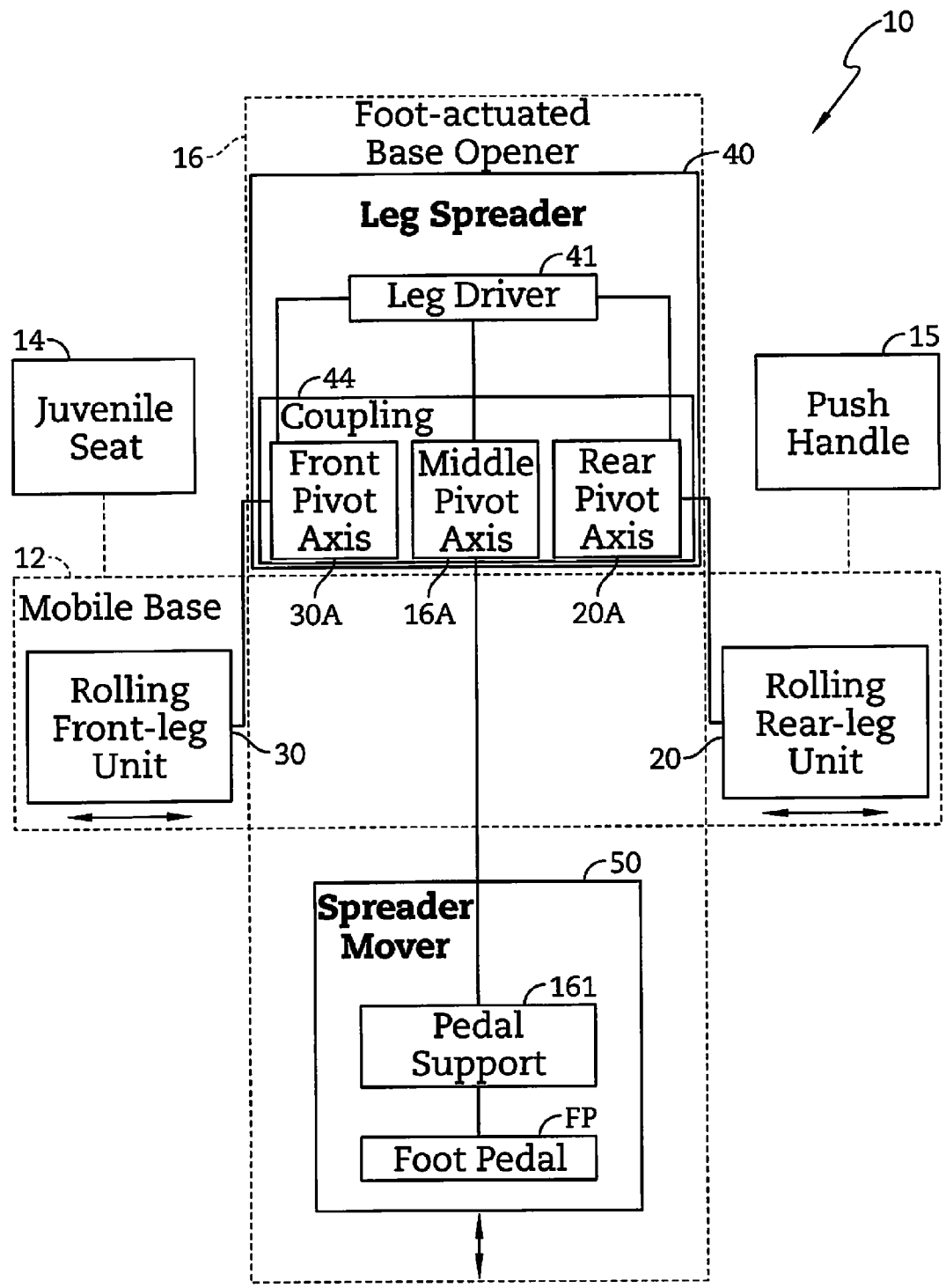
FIG. 3 is diagrammatic view of a collapsible stroller in accordance with an embodiment of the present disclosure.

A collapsible stroller 10 in accordance with the present disclosure includes a mobile base 12, a juvenile seat 14 coupled to mobile base 12, and a push handle 15 coupled to mobile base 12 as suggested illustratively in FIGS. 1 and 2 and diagrammatically in FIG. 3. Stroller 10 includes a foot-actuated base opener 16 for use by a caregiver to unfold mobile base 12 as suggested in FIGS. 1 and 2 to change stroller 10 from a collapsed storage mode shown in FIG. 1 to an expanded use mode shown in FIG. 2.

Mobile base 12 of stroller 10 includes a rolling rear-leg unit 20 and a rolling front-leg unit 30 mounted for pivotable movement on a leg spreader 40 about separated leg-pivot axes 20A, 30A between a folded position associated with a collapsed storage mode of stroller 10 and shown in FIG. 1 and an unfolded position associated with an expanded use mode of stroller 10 and shown in FIG. 2. Foot-actuated base opener 16 is coupled to leg spreader 40 as suggested in FIG. 1 and configured to include a foot pedal FP and to provide means for unfolding mobile base 12 to change mobile base 12 from the folded position shown in FIG. 1 to the unfolded position shown in FIG. 2 in response to application of a downward force F to foot pedal FP.

Mobile base 12 is configured to roll around and carry any suitable juvenile seat 14 as suggested in FIG. 2 and to fold when not in use to assume a folded position as suggested in FIG. 1. Unfolding of mobile base 12 of stroller 10 is accomplished easily by applying a downward pedal-actuation force F to foot pedal FP of foot-actuated base opener 16 as suggested in FIG. 2 until rolling front-leg unit 30 is pivoted about leg-pivot axis 30A in a clockwise direction (CW) and rolling rear-leg unit 20 is pivoted about leg-pivot axis 20A in a counterclockwise direction (CCW).

Rolling rear-leg unit 20 of mobile base 12 can include a rear frame 201 arranged to intersect leg-pivot axis 20A and rear wheels 202 mounted on rear frame 201 for rotation about an axis of rotation 202A as suggested in FIGS. 1 and 2. Rear frame 201 can include a horizontally extending rear strut (not shown) lying between rear wheels 202 and extending along axis of rotation 202A.

Rolling front-leg unit 30 of mobile base 12 includes a front fame 301 arranged to intersect leg-pivot axis 30A and front wheels 302 mounted on front frame 301 using a swivel mount in an illustrative embodiment as suggested in FIGS. 1 and 2. Front frame 301 includes a horizontally extending front strut (not shown) lying between front wheels 302 and in generally parallel relation to the rear strut.

A compact collapsible stroller 10 in accordance with an illustrative embodiment of the present disclosure includes a mobile base 12 provided with front and rear wheels 302, 202 and a push handle 15 coupled to mobile base 12 as suggested diagrammatically in FIGS. 1 and 2. Any suitable tray 17 may be coupled for pivotable movement to leg spreader 40 as shown or to any other part of stroller 10.

In illustrative embodiments, mobile base 12 is foldable at the option of a caregiver and includes a leg spreader 40, rolling rear-leg unit 20, and a rolling front-leg unit 30 that can be moved away from a folded position shown in FIG. 1 and located alongside the rolling rear-leg unit 20 and associated with a collapsed storage mode of stroller 10 to an unfolded position shown in FIG. 2 and associated with an expanded use mode of stroller 10 when the mobile base 12 is unfolded so that a child can be seated on a juvenile seat 14 coupled to mobile base 12. Rear-leg unit 20 is coupled to leg spreader 40 for pivotable movement about a rear pivot axis 20A. Front-leg unit 30 is coupled to leg spreader 40 for pivotable movement about a front pivot axis 30A that is arranged to lie in spaced-apart relation to rear pivot axis 20A.

Stroller 10 further includes a foot-actuated base opener 16 coupled to leg spreader 40 of the mobile base 12. Foot-actuated base opener 16 comprises a foot pedal FP, a pedal support 161 have a lower portion coupled to foot pedal FP and an upper portion pivotably coupled to leg spreader 40 for pivotable movement about pivot axis 16A, and a pedal-return spring 162.

A caregiver operates the foot-actuated base opener 16 to change stroller 10 from a collapsed storage mode to an expanded use mode by stepping on a foot pedal FP included in foot-actuated base opener 16 and moving the foot pedal FP toward the ground G underlying the mobile base 12. This downward movement of foot pedal FP causes downward movement of leg spreader 40 toward ground G underlying mobile base 12 which effects a torque to move the rolling front-leg unit 30 in a first direction (CW) about front pivot axis 30A away from the folded position located alongside the rolling rear-leg unit 20 to the unfolded position associated with the expanded use mode of the stroller 10 and to move the rolling rear-leg unit 20 in an opposite second direction (CCW) about the rear pivot axis 20A. This causes mobile base 12 to move from the folded position shown in FIG. 1 to the unfolded position shown in FIG. 2.

Pedal-return spring 162 of foot-actuated base opener 16 is coupled to leg spreader 40 and to pedal support 161 and configured normally to apply a torque to the pivotable pedal support 161 to urge the pedal support 161 and foot pedal FP to lie out of the way and alongside the rolling rear-leg unit 20. Pedal support 161 has a lower portion coupled to foot pedal FP and an upper portion pivotably coupled to leg spreader 40. Pedal-return spring 162 is configured to provide torsion means for yieldably applying a torque to pedal support 161 to pivot pedal support 161 to pivot pedal support 161 about a pivot axis to a ready-to-use retracted position alongside rolling rear-leg unit 20 so that the foot pedal FP is arranged to receive a downward force to move the foot pedal FP closer to the ground G and cause the mobile 10 to unfold. In such a ready-to-use retracted position, foot pedal FP is nevertheless accessible and usable by a caregiver desiring to step on the foot pedal FP to unfold mobile base 12 using foot action to convert stroller 10 from the collapsed storage mode shown in FIG. 1 to the expanded use mode shown in FIG. 2.

A collapsible stroller 10 comprises a mobile base 12, a juvenile seat 14, and a foot-actuated base opener 16 as suggested illustratively in FIGS. 1 and 2 and diagrammatically in FIG. 3. Foot-actuated base opener 16 is configured to be operated by a caregiver to open a collapsed stroller as suggested in FIGS. 1 and 2 by applying a downward force F to the foot-actuated base opener 16.

Mobile base 12 includes a rolling rear-leg unit 20 having a rear wheel 202 and a rolling front-leg unit 30 having a front wheel 302. Rolling front-leg unit 30 is mounted for folding movement relative to the rolling rear-leg unit 20 between a folded position alongside the rolling rear-leg unit 30 and associated with a collapsed storage mode of the stroller 10 wherein the front and rear wheels 302, 202 are arranged to lie in close proximity to one another to define a first distance D1 therebetween as shown in FIG. 1 and an unfolded position separated from rolling rear-leg unit 20 associated with an expanded use mode of stroller 10 wherein front and rear wheels 302, 202 are arranged to lie in spread-apart relation to one another to define a greater second distance D2 therebetween as shown in FIG. 2.

Juvenile seat 14 is mounted for movement with mobile base 12. Any suitable juvenile seat may be used.

Foot-actuated base opener 16 includes a spreader mover 50 including a first foot pedal and a leg spreader 50 as suggested diagrammatically in FIG. 3. Leg spreader 40 is coupled to the rolling rear-leg unit 20, the rolling front-leg unit 30, and the spreader mover 50 for movement relative to each of the rolling rear-leg and front-leg units 20, 30 between a drawn-together leg position shown illustratively in FIG. 1 and associated with the collapsed storage mode of the stroller 10 and a spread-apart leg position shown illustratively in FIG. 2 and associated with the expanded use mode of the stroller 10.

Spreader mover 50 further includes pedal-support means 161 for moving the leg spreader 40 relative to the rear and front wheels 202, 302 from the drawn-together leg position to the spread-apart leg position to unfold rolling front-leg unit 30 of mobile base 12 and move front wheel 302 of rolling front-leg unit 30 away from rear wheel 202 of rolling rear-leg unit 20 in response to application of a downward force F to the foot pedal FP. This causes the rolling front-leg unit 20 to be moved from the folded position alongside rolling rear-leg unit 30 to the unfolded position separated from rolling rear-leg unit 30 as suggested in FIG. 2.

Leg spreader 40 includes a leg driver 41 arranged to move relative to each of rolling front-leg and rear-leg units 30, 20 during change of stroller 10 from the collapsed storage mode to the expanded use mode and a coupling 44 configured to provide pivot means for pivotably coupling leg driver 41 to each of the rolling front-leg unit 30, rolling rear-leg unit 20, and pedal-support means 161 to cause rolling front-leg unit 30 to pivot about a front axis 30A relative to leg driver 41 to move from the folded position alongside rolling rear-leg unit 20 to the unfolded position separated from rolling rear-leg unit 20 in response to application of the downward force F to the foot pedal FP included in spreader mover 50. The pedal-support means 161 is arranged to locate the foot pedal FP below juvenile seat 14 and the pivot means 44 and above ground G underlying the front and rear wheels 302, 202 upon movement of rolling front-leg unit 30 to the unfolded position.

Spreader mover 50 further includes spring means 162 for yieldably urging the pedal-support means 161 to move relative to leg driver 41 from an extended position separated from rolling rear-leg unit 20 and arranged to define an included angle therebetween of greater than 20° to a retracted position arranged to lie alongside rolling rear-leg unit 20 until a downward force F in excess of a predetermined amount is applied to the foot pedal FP to cause the pedal-support means 161 to pivot about an axis and move away from rolling rear-leg unit 20.

In illustrative embodiments, leg driver 41 of leg spreader 40 is pivotably coupled to rolling rear-leg unit 20 for pivotable movement about a rear pivot axis 20A. Leg driver 41 is pivotably coupled to rolling front-leg unit 30 for pivotable movement about a front pivot axis 30A that is arranged to lie in laterally spaced-apart relation to rear pivot axis 20A. Leg driver 41 is pivotably coupled to the pedal-support means 161 for pivotable movement about a middle pivot axis 16A.

In illustrative embodiments, rolling front-leg unit 30 is arranged to pivot about front pivot axis 30A in a clockwise direction (CW) away from the folded position located alongside rolling rear-leg unit 20 to the unfolded position associated with the expanded use mode of stroller 10. Rolling rear-leg unit 20 is arranged to pivot about rear pivot axis 20A in a counterclockwise direction (CCW) in response to downward movement of the foot pedal FP toward ground underlying the front and rear wheels 302, 202.

A pedal-return spring 162 is coupled to leg driver 41 of leg spreader 40 and the pedal-support means 161. Pedal-return spring 162 is arranged to apply a torque to the pedal-support means 161 to urge the foot pedal FP normally and yieldably to assume a ready-to-use retracted position alongside rolling rear-leg unit 20 when stroller 10 is in the expanded use mode.

The invention claimed is:

1. A collapsible stroller comprising
a mobile base including a rolling rear-leg unit having a rear wheel and a rolling front-leg unit having a front wheel and being mounted for folding movement relative to the rolling rear-leg unit between a folded position alongside the rolling rear-leg unit and associated with a collapsed storage mode of the stroller wherein the front and rear wheels are arranged to lie in close proximity to one another to define a first distance therebetween and an unfolded position separated from the rolling rear-leg unit associated with an expanded use mode of the stroller wherein the front and rear wheels are arranged to lie in spread-apart relation to one another to define a greater second distance therebetween,
a juvenile seat mounted for movement with the mobile base, and
a foot-actuated base opener including
a spreader mover including a first foot pedal and
a leg spreader coupled to the rolling rear-leg unit at a rear pivot axis, the rolling front-leg unit at a front pivot axis, and the spreader mover for movement relative to each of the rolling rear-leg and front-leg units between a drawn-together leg position associated with the collapsed storage mode of the stroller and a spread-apart leg position associated with the expanded use mode of the stroller,
wherein the spreader mover further includes pedal-support means for effecting a torque to move the rear and front wheels about the rear and front axes from the drawn-together leg position to the spread-apart leg position to unfold the rolling front-leg unit of the mobile base and move the front wheel of the rolling front-leg unit away from the rear wheel of the rolling rear-leg unit in response to application of a downward force to the first foot pedal so that the rolling front-leg unit is moved from the folded position alongside the rolling rear-leg unit to the unfolded position separated from the rolling rear-leg unit.

2. The collapsible stroller of claim 1, wherein the leg spreader includes a leg driver arranged to move relative to each of the rolling front-leg and rear-leg units during change of the stroller from the collapsed storage mode to the expanded use mode and pivot means for pivotably coupling the leg driver to each of the rolling front-leg unit, rolling rear-leg unit, and the pedal-support means to cause the rolling front-leg unit to pivot about an axis relative to the leg driver to move from the folded position alongside the rolling rear-leg unit to the unfolded position separated from the rolling rear-leg unit in response to application of the downward force to the first foot pedal included in the spreader mover.

3. The collapsible stroller of claim 2, wherein the pedal-support means is arranged to locate the first foot pedal below the juvenile seat and the pivot means and above ground underlying the front and rear wheels upon movement of the rolling front-leg unit to the unfolded position.

4. A collapsible stroller comprising
a mobile base including a rolling rear-leg unit having a rear wheel and a rolling front-leg unit having a front wheel and being mounted for folding movement relative to the rolling rear-leg unit between a folded position alongside the rolling rear-leg unit and associated with a collapsed storage mode of the stroller wherein the front and rear wheels are arranged to lie in close proximity to one another to define a first distance therebetween and an unfolded position separated from the rolling rear-leg unit associated with an expanded use mode of the stroller wherein the front and rear wheels are arranged to lie in spread-apart relation to one another to define a greater second distance therebetween,
a juvenile seat mounted for movement with the mobile base, and
a foot-actuated base opener including
a spreader mover including a first foot pedal and
a leg spreader coupled to the rolling rear-leg unit, the rolling front-leg unit, and the spreader mover for movement relative to each of the rolling rear-leg and front-leg units between a drawn-together leg position associated with the collapsed storage mode of the stroller and a spread-apart leg position associated with the expanded use mode of the stroller,
wherein the spreader mover further includes pedal-support means for moving the leg spreader relative to the rear and front wheels from the drawn-together leg position to the spread-apart leg position to unfold the rolling front-leg unit of the mobile base and move the front wheel of the rolling front-leg unit away from the rear wheel of the rolling rear-leg unit in response to application of a downward force to the first foot pedal so that the rolling front-leg unit is moved from the folded position alongside the rolling rear-leg unit to the unfolded position separated from the rolling rear-leg unit, wherein the leg spreader includes a leg driver arranged to move relative to each of the rolling front-leg and rear-leg units during change of the stroller from the collapsed storage mode to the expanded use mode and pivot means for pivotably coupling the leg driver to each of the rolling front-leg unit, rolling rear-leg unit, and the pedal-support means to cause the rolling front-leg unit to pivot about an axis relative to the leg driver to move from the folded position alongside the rolling rear-leg unit to the unfolded position separated from the rolling rear-leg unit in response to application of the downward force to the first foot pedal included in the spreader mover, and wherein the spreader mover further includes spring means for yieldably urging the pedal-support means to move relative to the leg driver from an extended position separated from the rolling rear-leg unit and arranged to define an included angle therebetween of greater than 20° to a retracted position arranged to lie alongside the rolling rear-leg unit until a downward force in excess of a predetermined amount is applied to the first foot pedal to cause the pedal-support means to pivot about an axis and move away from the rolling rear-leg unit.

5. A collapsible stroller comprising a mobile base including a rolling rear-leg unit having a rear wheel and a rolling front-leg unit having a front wheel and being mounted for folding movement relative to the rolling rear-leg unit between a folded position alongside the rolling rear-leg unit and associated with a collapsed storage mode of the stroller wherein the front and rear wheels are arranged to lie in close proximity to one another to define a first distance therebetween and an unfolded position separated from the rolling rear-leg unit associated with an expanded use mode of the stroller wherein the front and rear wheels are arranged to lie in spread-apart relation to one another to define a greater second distance therebetween, a juvenile seat mounted for movement with the mobile base, and a foot-actuated base opener including a spreader mover including a first foot pedal and a leg spreader coupled to the rolling rear-leg unit, the rolling front-leg unit, and the spreader mover for movement relative to each of the rolling rear-leg and front-leg units between a drawn-together leg position associated with the collapsed storage mode of the stroller and a spread-apart leg position associated with the expanded use mode of the stroller, wherein the spreader mover further includes pedal-support means for moving the leg spreader relative to the rear and front wheels from the drawn-together leg position to the spread-apart leg position to unfold the rolling front-leg unit of the mobile base and move the front wheel of the rolling front-leg unit away from the rear wheel of the rolling rear-leg unit in response to application of a downward force to the first foot pedal so that the rolling front-leg unit is moved from the folded position alongside the rolling rear-leg unit to the unfolded position separated from the rolling rear-leg unit, and wherein the leg spreader includes a leg driver arranged to move relative to each of the rolling front-leg and rear-leg units during change of the stroller from the collapsed storage mode to the expanded use mode and pivotably coupled to each of the rolling front-leg unit, rolling rear-leg unit, and pedal-support means to cause the rolling front-leg unit to pivot about an axis relative to the leg driver from the folded position alongside the rolling rear-leg unit to the unfolded position separated from the rolling rear-leg unit in response to application of the downward force to the first foot pedal.

6. A collapsible stroller comprising a mobile base including a rolling rear-leg unit having a rear wheel and a rolling front-leg unit having a front wheel and being mounted for folding movement relative to the rolling rear-leg unit between a folded position alongside the rolling rear-leg unit and associated with a collapsed storage mode of the stroller wherein the front and rear wheels are arranged to lie in close proximity to one another to define a first distance therebetween and an unfolded position separated from the rolling rear-leg unit associated with an expanded use mode of the stroller wherein the front and rear wheels are arranged to lie in spread-apart relation to one another to define a greater second distance therebetween, a juvenile seat mounted for movement with the mobile base, and a foot-actuated base opener including a spreader mover including a first foot pedal and a leg spreader coupled to the rolling rear-leg unit, the rolling front-leg unit, and the spreader mover for movement relative to each of the rolling rear-leg and front-leg units between a drawn-together leg position associated with the collapsed storage mode of the stroller and a spread-apart leg position associated with the expanded use mode of the stroller, wherein the spreader mover further includes pedal-support means for moving the leg spreader relative to the rear and front wheels from the drawn-together leg position to the spread-apart leg position to unfold the rolling front-leg unit of the mobile base and move the front wheel of the rolling front-leg unit away from the rear wheel of the rolling rear-leg unit in response to application of a downward force to the first foot pedal so that the rolling front-leg unit is moved from the folded position alongside the rolling rear-leg unit to the unfolded position separated from the rolling rear-leg unit, and wherein the leg spreader includes a leg driver arranged to move relative to each of the rolling front-leg and rear-leg units during change of the stroller from the collapsed storage mode to the expanded use mode and pivot means for pivotably coupling the leg driver to each of the rolling front-leg unit, rolling rear-leg unit, and the pedal-support means to cause the rolling front-leg unit to pivot about an axis relative to the leg driver to move from the folded position alongside the rolling rear-leg unit to the unfolded position separated from the rolling rear-leg unit in response to application of the downward force to the first foot pedal included in the spreader mover.

7. A collapsible stroller comprising a mobile base including a rolling rear-leg unit having a rear wheel and a rolling front-leg unit having a front wheel and being mounted for folding movement relative to the rolling rear-leg unit between a folded position alongside the rolling rear-leg unit and associated with a collapsed storage mode of the stroller wherein the front and rear wheels are arranged to lie in close proximity to one another to define a first distance therebetween and an unfolded position separated from the rolling rear-leg unit associated with an expanded use mode of the stroller wherein the front and rear wheels are arranged to lie in spread-apart relation to one another to define a greater second distance therebetween, a juvenile seat mounted for movement with the mobile base, and a foot-actuated base opener including a spreader mover including a first foot pedal and a leg spreader coupled to the rolling rear-leg unit, the rolling front-leg unit, and the spreader mover for movement relative to each of the rolling rear-leg and front-leg units between a drawn-together leg position associated with the collapsed storage mode of the stroller and a spread-apart leg position associated with the expanded use mode of the stroller, wherein the spreader mover further includes pedal-support means for moving the leg spreader relative to the rear and front wheels from the drawn-together leg position to the spread-apart leg position to unfold the rolling front-leg unit of the mobile base and move the front wheel of the rolling front-leg unit away from the rear wheel of the rolling rear-leg unit in response to application of a downward force to the first foot pedal so that the rolling front-leg unit is moved from the folded position alongside the rolling rear-leg unit to the unfolded position separated from the rolling rear-leg unit, and wherein the leg driver is pivotably coupled to the rolling rear-leg unit for pivotable movement about a rear pivot axis, the leg driver is pivotably coupled to the rolling front-leg unit for pivotable movement about a front pivot axis that is arranged to lie in laterally spaced-apart relation to the rear pivot axis, and the leg driver is pivotably coupled to the pedal-support means for pivotable movement about a middle pivot axis.

8. The collapsible stroller of claim 7, wherein the rolling front-leg unit is arranged to pivot about the front pivot axis in a clockwise direction away from the folded position located alongside the rolling rear-leg unit to the unfolded position associated with the expanded use mode of the stroller and the rolling rear-leg unit is arranged to pivot about the rear pivot axis in a counterclockwise direction in response to downward movement of the first foot pedal toward ground underlying the front and rear wheels.

9. The collapsible stroller of claim 8, further comprising a pedal-return spring coupled to the leg driver and the pedal-support means and arranged to apply a torque to the pedal-support means to urge the first foot pedal normally and yieldably to assume a ready-to-use retracted position alongside the rolling rear-leg unit when the stroller is in the expanded use mode.

10. A collapsible stroller comprising a mobile base including a rolling rear-leg unit and a rolling front-leg unit arranged to move relative to the rolling rear-leg unit from a folded position located alongside the rolling rear-leg unit and associated with a collapsed storage mode of the collapsible stroller to an unfolded position located apart from the rolling rear-leg unit and associated with an expanded use mode of the collapsible stroller, and a foot-actuated base opener formed to provide means for effecting a torque to move the rolling front-leg unit about a front axis away from the rolling rear-leg unit from the folded position to the unfolded position to unfold the mobile base in response to application of a downward force to a foot pedal included in the foot-actuator base opener to move the foot pedal closer to ground underlying the mobile base so that the collapsible stroller changes from the collapsed storage mode to the expanded use mode.

11. A collapsible stroller comprising a mobile base including a rolling rear-leg unit and a rolling front-leg unit arranged to move relative to the rolling rear-leg unit from a folded position located alongside the rolling rear-leg unit and associated with a collapsed storage mode of the collapsible stroller to an unfolded position located apart from the rolling rear-leg unit and associated with an expanded use mode of the collapsible stroller, and a foot-actuated base opener formed to provide means for moving the rolling front-leg unit away from the rolling rear-leg unit from the folded position to the unfolded position to unfold the mobile base in response to application of a downward force to a foot pedal included in the foot-actuator base opener to move the foot pedal closer to ground underlying the mobile base so that the collapsible stroller changes from the collapsed storage mode to the expanded use mode, and wherein the mobile base further includes a leg spreader arranged to extend between the rolling front-leg and rear-leg units and coupled to the foot-actuated base opener, the rolling front-leg unit is coupled to the leg spreader for pivotable movement about a front leg-pivot axis, and the rolling rear-leg unit is coupled to the leg spreader for pivotable movement about a rear-leg pivot axis that is arranged to lie in spaced-apart relation to the leg-pivot axis associated with the rolling front-leg unit.

12. The collapsible stroller of claim 11, wherein the foot-actuated base opener includes a pedal support having a lower portion coupled to the foot pedal and an upper portion pivotably coupled to the leg spreader.

13. The collapsible stroller of claim 12, wherein the foot-actuated base opener further includes a pedal-return spring coupled to the leg spreader and to the pedal support and configured to provide torsion means for yieldably applying a torque to the pedal support to pivot the pedal support about a pivot axis to a ready-to-use retracted position alongside the rolling rear-leg unit so that the foot pedal is arranged to receive a downward force to move the foot pedal closer to the ground and cause the mobile base to unfold.

* * * * *